US012356209B2

United States Patent
Ma et al.

(10) Patent No.: US 12,356,209 B2
(45) Date of Patent: Jul. 8, 2025

(54) COVERAGE INDICATOR PREDICTION METHOD, MODEL TRAINING METHOD AND APPARATUS, DEVICE AND MEDIUM

(71) Applicant: ZTE CORPORATION, Guangdong (CN)

(72) Inventors: Xiaoxiao Ma, Guangdong (CN); Ao Xue, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 358 days.

(21) Appl. No.: 17/927,833

(22) PCT Filed: Mar. 16, 2021

(86) PCT No.: PCT/CN2021/081103
§ 371 (c)(1),
(2) Date: Nov. 25, 2022

(87) PCT Pub. No.: WO2021/238346
PCT Pub. Date: Dec. 2, 2021

(65) Prior Publication Data
US 2023/0217261 A1    Jul. 6, 2023

(30) Foreign Application Priority Data
May 26, 2020   (CN) .......................... 202010459738.X

(51) Int. Cl.
*H04W 16/22*  (2009.01)
*H04W 16/18*  (2009.01)

(52) U.S. Cl.
CPC .......... *H04W 16/22* (2013.01); *H04W 16/18* (2013.01)

(58) Field of Classification Search
CPC ..... H04W 16/22; H04W 16/18; H04W 24/04; H04W 16/24; G06N 5/01; G06N 20/20; H04L 41/145
See application file for complete search history.

(56) References Cited

U.S. PATENT DOCUMENTS 10,431,103 B2 * 10/2019 Murphy ................. H04W 24/08
10,555,192 B2 *  2/2020 Yang ......................... G06N 3/02
(Continued)

FOREIGN PATENT DOCUMENTS

CN  100364355 C  *  1/2008
CN  105163337 A  * 12/2015 ............ H04W 24/02
(Continued)

OTHER PUBLICATIONS

China Patent Office, First Office Action issued Aug. 1, 2024 for application No. CN202010459738.X.
(Continued)

*Primary Examiner* — Yuwen Pan
*Assistant Examiner* — Swati Jain
(74) *Attorney, Agent, or Firm* — Li & Cai Intellectual Property (USA) Office

(57) ABSTRACT

Provided is a coverage indicator prediction method. The method includes: obtaining a wireless cell feature of a wireless cell to be predicted, a geographical environment feature of the wireless cell to be predicted, a grid geographical environment feature, and a feature of a wireless propagation path from the wireless cell to be predicted to a corresponding grid, where grids are obtained by dividing a designated region; and predicting, according to the wireless cell feature of the wireless cell to be predicted, the geographical environment feature of the wireless cell to be predicted, the grid geographical environment feature, and the feature of the wireless propagation path from the wire-
(Continued)

---

1021 — Obtain coverage indicator sample features and cell grid granularity label data of a wireless cell and a corresponding grid in a designated region; where the coverage indicator sample features include: a wireless cell feature of the wireless cell, a geographical environment feature of the wireless cell, a grid geographical environment feature, and a feature of a wireless propagation path from the wireless cell to the corresponding grid; and the cell grid granularity label data includes: a statistical coverage indicator value of a same wireless cell in a same grid obtained by aggregating all coverage indicator values of the wireless cell in the grid to all terminals 1022 — Train a coverage indicator prediction model according to the coverage indicator sample features and the cell grid granularity label data of the wireless cell and the corresponding grid in the designated region less cell to be predicted to the corresponding grid, a coverage indicator value of the grids using a trained coverage indicator prediction model. Coverage indicator prediction apparatus, model training method and apparatus, electronic device, and computer-readable storage medium are also provided.

17 Claims, 4 Drawing Sheets

(56) References Cited

U.S. PATENT DOCUMENTS

| | | | |
|---|---|---|---|
| 2006/0121906 A1* | 6/2006 | Stephens | H04W 16/18 455/446 |
| 2009/0176500 A1* | 7/2009 | Panico | H04W 16/02 455/67.11 |
| 2012/0083281 A1* | 4/2012 | Watanabe | H04W 24/02 455/446 |
| 2013/0281100 A1* | 10/2013 | Lanzo | H04W 16/18 455/446 |
| 2014/0057638 A1* | 2/2014 | Carey | H04W 16/18 455/446 |
| 2017/0040004 A1* | 2/2017 | He | G09G 5/026 |

FOREIGN PATENT DOCUMENTS

| | | | | |
|---|---|---|---|---|
| CN | 108271165 A | * | 7/2018 | ............ H04W 16/18 |
| CN | 108307427 A | | 7/2018 | |
| CN | 109495898 A | | 3/2019 | |
| CN | 109996186 A | | 7/2019 | |
| CN | 110418354 A | * | 11/2019 | |
| CN | 111062466 A | * | 4/2020 | ......... G01R 29/0821 |
| WO | WO-2024003856 A1 | * | 1/2024 | |

OTHER PUBLICATIONS

WIPO, International Search Report issued on Jun. 1, 2021.
European Patent Office, The extended European search report issued on Apr. 22, 2024 for application No. EP21814183.6.

* cited by examiner

COVERAGE INDICATOR PREDICTION METHOD, MODEL TRAINING METHOD AND APPARATUS, DEVICE AND MEDIUM

TECHNICAL FIELD

Embodiments of the present disclosure relate to, but are not limited to, the field of communications and computers.

BACKGROUND

With the continuous development of mobile communication technology, the continuous increased user quantity and the rapid increase of wireless traffic, how to conduct high-quality planning and optimization for wireless networks has become more and more important. The accuracy of an coverage indicator of a wireless cell is key to the accuracy of coverage assessment. The industry mainly relies on a propagation model to estimate the propagation path loss, and thereby obtain the coverage indicator. However, due to the complexity and variability of the wireless environment, the propagation model technology tends to have a low efficiency and poor prediction precision.

SUMMARY

Embodiments of the present disclosure provide a coverage indicator prediction method and apparatus, a model training method and apparatus, an electronic device, and a computer-readable medium.

In a first aspect, an embodiment of the present disclosure provides a coverage indicator prediction method, including: obtaining a wireless cell feature of a wireless cell to be predicted, a geographical environment feature of the wireless cell to be predicted, a grid geographical environment feature, and a feature of a wireless propagation path from the wireless cell to be predicted to a corresponding grid, wherein grids are obtained by dividing a designated region; and predicting, according to the wireless cell feature of the wireless cell to be predicted, the geographical environment feature of the wireless cell to be predicted, the grid geographical environment feature, and the feature of the wireless propagation path from the wireless cell to be predicted to the corresponding grid, a coverage indicator value of the grids using a trained coverage indicator prediction model.

In a second aspect, an embodiment of the present disclosure provides a model training method, including: obtaining coverage indicator sample features and cell grid granularity label data of a wireless cell and a corresponding grid in a designated region; wherein the coverage indicator sample features include: a wireless cell feature of the wireless cell, a geographical environment feature of the wireless cell, a grid geographical environment feature, and a feature of a wireless propagation path from the wireless cell to the corresponding grid; and the cell grid granularity label data includes: a statistical coverage indicator value of a same wireless cell in a same grid obtained by aggregating all coverage indicator values of the wireless cell in the grid to all terminals; and wherein grids are obtained by dividing a designated region; and training a coverage indicator prediction model according to the coverage indicator sample features and the cell grid granularity label data of the wireless cell and the corresponding grid in the designated region.

In a third aspect, an embodiment of the present disclosure provides an electronic device, including: at least one processor; and a storage device having at least one program stored thereon which, when executed by the at least one processor, causes the at least one processor to implement any coverage indicator prediction method as described herein, or any model training method as described herein.

In a fourth aspect, an embodiment of the present disclosure provides a computer-readable storage medium storing a computer program thereon which, when executed by a processor, causes the processor to implement any coverage indicator prediction method as described herein, or any model training method as described herein.

DETAIL DESCRIPTION OF EMBODIMENTS

In order to make those skilled in the art better understand the technical solutions of the present disclosure, the coverage indicator prediction method and apparatus, the model training method and apparatus, the electronic device and the computer-readable medium of present disclosure will be described in detail below with reference to the accompany drawings.

Example embodiments will be described more sufficiently below with reference to the accompanying drawings, but which may be embodied in different forms and should not be construed as limited to the embodiments set forth herein. Rather, these embodiments are provided so that the present disclosure will be thorough and complete, and will fully convey the scope of the present disclosure to those skilled in the art.

The embodiments of the present disclosure and features thereof may be combined with each other as long as they are not contradictory.

As used herein, the term "and/or" includes any and all combinations of at least one of the associated listed items.

The terminology used herein is for the purpose of describing specific embodiments only and is not intended to limit the present disclosure. As used herein, the singular forms "a", "an" and "the" are intended to include the plural forms as well, unless the context clearly indicates otherwise. It will be further understood that as used herein, the terms "comprise" and/or "consist of . . . " specify the presence of the stated features, integers, steps, operations, elements, and/or components, but do not preclude the presence or addition of at least one other feature, integer, step, operation, element, component, and/or group thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present disclosure, and will not be interpreted in an idealized or overly formal sense unless expressly so defined herein.

Figure 1:
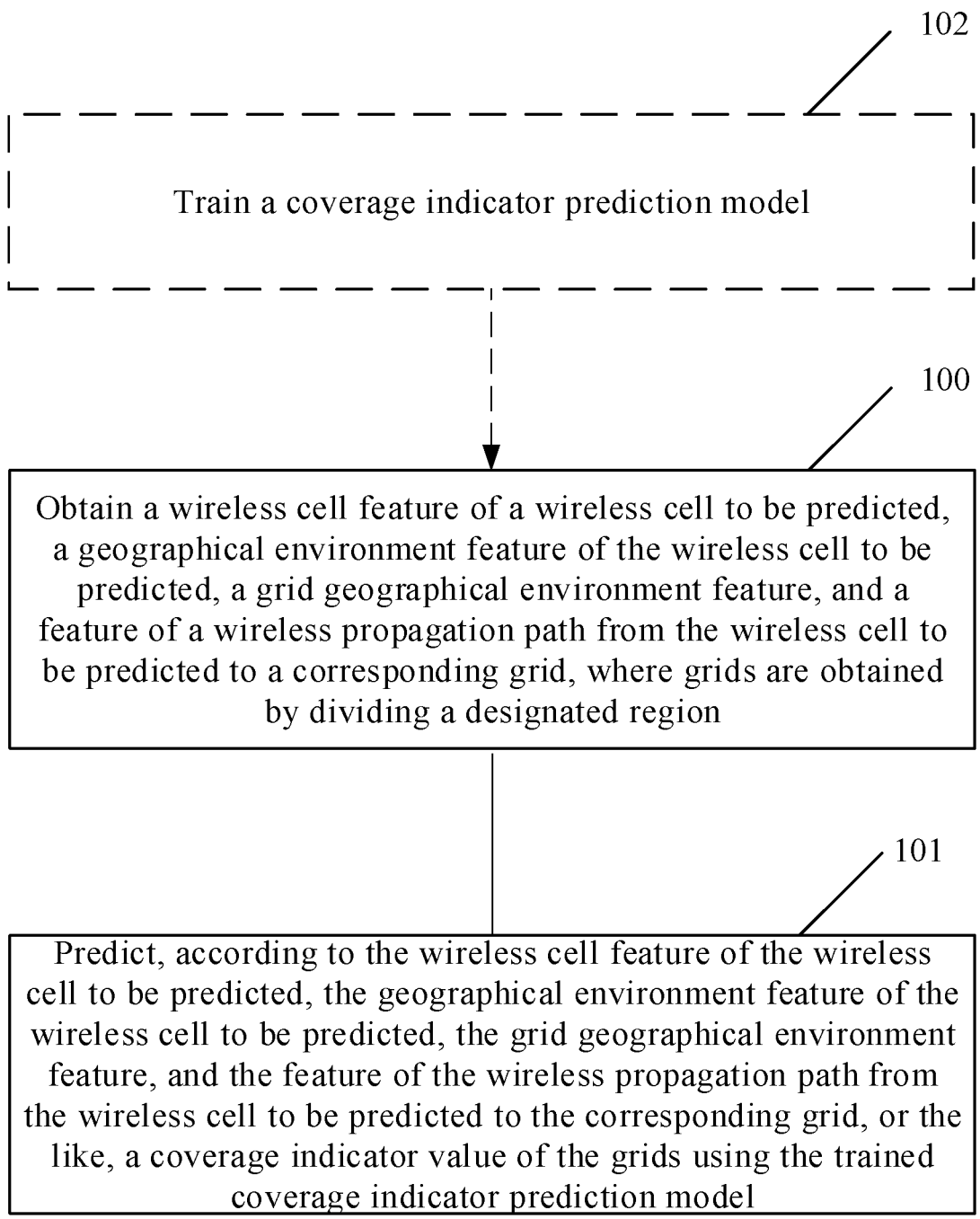
FIG. 1 is a flowchart of a coverage indicator prediction method according to an embodiment of the present disclosure.

FIG. 1 is a flowchart of a coverage indicator prediction method according to an embodiment of the present disclosure.

In a first aspect, referring to FIG. 1, an embodiment of the present disclosure provides a coverage indicator prediction method which may be applied to a communication network such as 2G/3G/4G/5G, or may be applied to a future more advanced communication network. The method may include the following operations 100 and 101.

At operation 100, obtaining a wireless cell feature of a wireless cell to be predicted, a geographical environment feature of the wireless cell to be predicted, a grid geographical environment feature, and a feature of a wireless propagation path from the wireless cell to be predicted to a corresponding grid, where grids are obtained by dividing a designated region.

In some exemplary embodiments, obtaining the wireless cell feature of the wireless cell to be predicted, the geographical environment feature of the wireless cell to be predicted, the grid geographical environment feature, and the feature of the wireless propagation path from the wireless cell to be predicted to the corresponding grid may include: obtaining wireless cell data for describing the wireless cell to be predicted, and map data for describing a geographical environment in grids in a coverage area of the wireless cell to be predicted; and determining, according to the wireless cell data for describing the wireless cell to be predicted and the map data for describing the geographical environment in each grid in the coverage area of the wireless cell to be predicted, the wireless cell feature of the wireless cell to be predicted, the geographical environment feature of the wireless cell to be predicted, the grid geographical environment feature, and the feature of the wireless propagation path from the wireless cell to be predicted to the corresponding grid, and the like.

In some exemplary embodiments, the wireless cell may be a base station or transmitter in a 2G/3G/4G/5G or other communication networks, or may be a base station or transmitter of a future more advanced communication network.

In some exemplary embodiments, the wireless cell data may be obtained from cell work parameter information.

In some exemplary embodiments, the wireless cell data may include at least one of: a wireless cell number, a wireless cell location (e.g., longitude and latitude of the wireless cell), a wireless cell name, wireless cell antenna information, a wireless cell station height, a wireless cell station type, or the like, or may include other information describing the wireless cell.

In some exemplary embodiments, the wireless cell antenna information may include at least one of: an antenna model, a transmitting power, a height, a direction, a downtilt angle, a horizontal lobe width, a vertical lobe width, a transmitting frequency, or the like, or may include other information describing the wireless cell antenna.

In some exemplary embodiments, the wireless cell station type may include at least one of: macro-station, microstation, room substation, or the like, or may include other information describing the wireless cell station type.

In some exemplary embodiments, the map data may be obtained from map information.

In some exemplary embodiments, the map data may include at least one of: a building average density, building type distribution, a building average height, terrain distribution, surface feature distribution, landform distribution, indoor and outdoor distribution, or the like, or may include other information describing the geographical environment.

In some exemplary embodiments, the building type distribution includes a proportion of each type of building, the terrain distribution includes a proportion of each type of terrain, the surface feature distribution includes a proportion of each type of surface feature, the landform distribution includes a proportion of each type of landform, and the indoor and outdoor distribution includes an indoor proportion and an outdoor proportion.

In some exemplary embodiments, the wireless cell data of the wireless cell to be predicted may be converted into digits to obtain the wireless cell feature of the wireless cell to be predicted. In other exemplary embodiments, the wireless cell data is directly used as the wireless cell feature. In some other embodiments, a portion of the wireless cell data is converted into digits to obtain the corresponding wireless cell feature, while another portion of the wireless cell data is used directly as the corresponding wireless cell feature.

In some exemplary embodiments, the wireless cell feature may include at least one of: a wireless cell number, a wireless cell location (e.g., longitude and latitude of the wireless cell), a wireless cell name, wireless cell antenna information, a wireless cell station height, a wireless cell station type, or the like, or may include other information describing the wireless cell.

In some exemplary embodiments, the map data within the coverage area of the wireless cell to be predicted may be collected to obtain the geographical environment feature of the wireless cell to be predicted.

In some exemplary embodiments, the geographical environment feature of the wireless cell to be predicted may include at least one of: a building average density, building type distribution, a building average height, terrain distribution, surface feature distribution, landform distribution, indoor and outdoor distribution, or the like, in the coverage area of the wireless cell to be predicted, or may include other information describing the geographical environment of the wireless cell to be predicted.

In some exemplary embodiments, the grid geographical environment feature may include at least one of: a building average density, building type distribution, a building average height, terrain distribution, surface feature distribution, landform distribution, indoor and outdoor distribution, or the like, in the grid, or may include other information describing the grid geographical environment.

In some exemplary embodiments, according to the wireless cell data for describing the wireless cell to be predicted and the map data for describing the geographical environment in each grid in the coverage area of the wireless cell to be predicted, the feature of the wireless propagation path from the wireless cell to be predicted to the corresponding grid may be determined.

In some exemplary embodiments, the feature of the wireless propagation path includes: a horizontal distance from an antenna to the grid, a vertical distance from the antenna to the grid, a linear distance from the antenna to the grid, a relative azimuth angle from the antenna to the grid in the horizontal direction, a relative azimuth angle from the antenna to the grid in the vertical direction, building type distribution on a propagation path from the antenna to the grid, a building average height on the propagation path from the antenna to the grid, terrain distribution on the propagation path from the antenna to the grid, surface feature distribution on the propagation path from the antenna to the grid, landform distribution on the propagation path from the antenna to the grid, a blocking degree on the propagation path from the antenna to the grid, or the like, or may include other features of the propagation path.

In some exemplary embodiments, the horizontal distance from the wireless cell antenna to the grid is: $d_h = \sqrt{(x_g-x_a)^2+(y_g-y_a)^2}$, in units of m (meters); where $P_a:(x_a, y_a)$ is a wireless cell antenna location, and $P_g:(x_g, y_g)$ is a grid location.

In some exemplary embodiments, the vertical distance of the wireless cell antenna to the grid is: $d_v = h_a - h_g$, in units of m (meters); where $h_a$ is a height of the wireless cell antenna, and $h_g$ is a height of a receiving antenna of a terminal.

In some exemplary embodiments, the linear distance from the wireless cell antenna to the grid is: $d = \sqrt{d_h^2 + d_v^2}$, in units of m (meters); where $d_h$ is the horizontal distance from the wireless cell antenna to the grid, and $d_v$ is the vertical distance from the wireless cell antenna to the grid.

In some exemplary embodiments, the receiving antenna of the terminal has a defaulted height $h_g = 1.5$, in units of m (meters).

In some exemplary embodiments, the relative azimuth angle from the wireless cell antenna to the grid in the horizontal direction is: $\theta_{ag} = \arccos(v_a \cdot v_g / (\|v_a\| \|v_g\|))$, where $v_a \cdot v_g = \sin(\alpha)(x_g - x_a) + \cos(\alpha)(y_g - y_a)$, $\|v_a\| = \sqrt{\sin(\alpha)\sin(\alpha) + \cos(\alpha)\cos(\alpha)} = 1$, and $\|v_g\| = \sqrt{(x_g - x_a)^2 + (y_g - y_a)^2}$, $\alpha$ is an angle between a horizontal main lobe direction of the wireless cell antenna and the north direction. $\theta$ is a horizontal lobe width of the wireless cell antenna.

In some exemplary embodiments, the relative azimuth angle from the wireless cell antenna to the grid in the vertical direction is: $\arctan(d_v/d_h)$.

In some exemplary embodiments, the blocking degree on the propagation path from the antenna to the grid may be described by at least one of: blocking degrees in eight directions (north, northeast, east, southeast, south, southwest, west, northwest) around the grid, blocking degrees in the eight directions around the wireless cell, a blocking degree of a highest obstruction in the propagation path, a blocking degree of a closest obstruction to the grid in the propagation path, a blocking degree of a closest obstruction to the antenna in the propagation path, or the like, or by any other blocking degree feature on the propagation path from the antenna to the grid.

In some exemplary embodiments, the blocking degrees in the eight directions (north, northeast, east, southeast, south, southwest, west, northwest) around the grid are indicated by building heights on the nearest grids in the eight directions around the grid.

In some exemplary embodiments, the blocking degrees in the eight directions around the wireless cell are indicated by building heights on the nearest grids in the eight directions around the grid where the wireless cell antenna is located.

In some exemplary embodiments, the blocking degree of the highest obstruction in the propagation path is indicated by a value obtained by subtracting the height of the wireless cell antenna from the height of the highest obstruction in the propagation path.

In some exemplary embodiments, the blocking degree of the closest obstruction to the grid in the propagation path is indicated by a value obtained by subtracting the height of the wireless cell antenna from the height of the closest obstruction to the grid in the propagation path.

In some exemplary embodiments, the blocking degree of the closest obstruction to the antenna in the propagation path is indicated by a value obtained by subtracting the height of the wireless cell antenna from the height of the closest obstruction to the antenna in the propagation path.

In some exemplary embodiments, by constructing coverage-related features accurately, the precision of the coverage prediction method can be further improved.

At operation 101, predicting, according to the wireless cell feature of the wireless cell to be predicted, the geographical environment feature of the wireless cell to be predicted, the grid geographical environment feature, and the feature of the wireless propagation path from the wireless cell to be predicted to the corresponding grid, or the like, a coverage indicator value of the grids using a trained coverage indicator prediction model.

In some exemplary embodiments, the wireless cell feature of the wireless cell to be predicted, the geographical environment feature of the wireless cell to be predicted, the grid geographical environment feature of each grid, and the feature of the wireless propagation path from the wireless cell to be predicted to the corresponding grid, and the like are input into a trained coverage indicator prediction model to predict a coverage indicator value of the grids.

In some exemplary embodiments, the coverage indicator prediction model includes a gradient-boosted tree model.

In some exemplary embodiments, all wireless cells to be predicted are predicted and output by a same coverage indicator prediction model, avoiding the case where a model is provided for each wireless cell, so that the online prediction speed of the model can be greatly increased, and the prediction efficiency can be improved.

In some embodiments, before operation 101, the method further includes an operation 102. At operation 102, training the coverage indicator prediction model.

Figure 2:
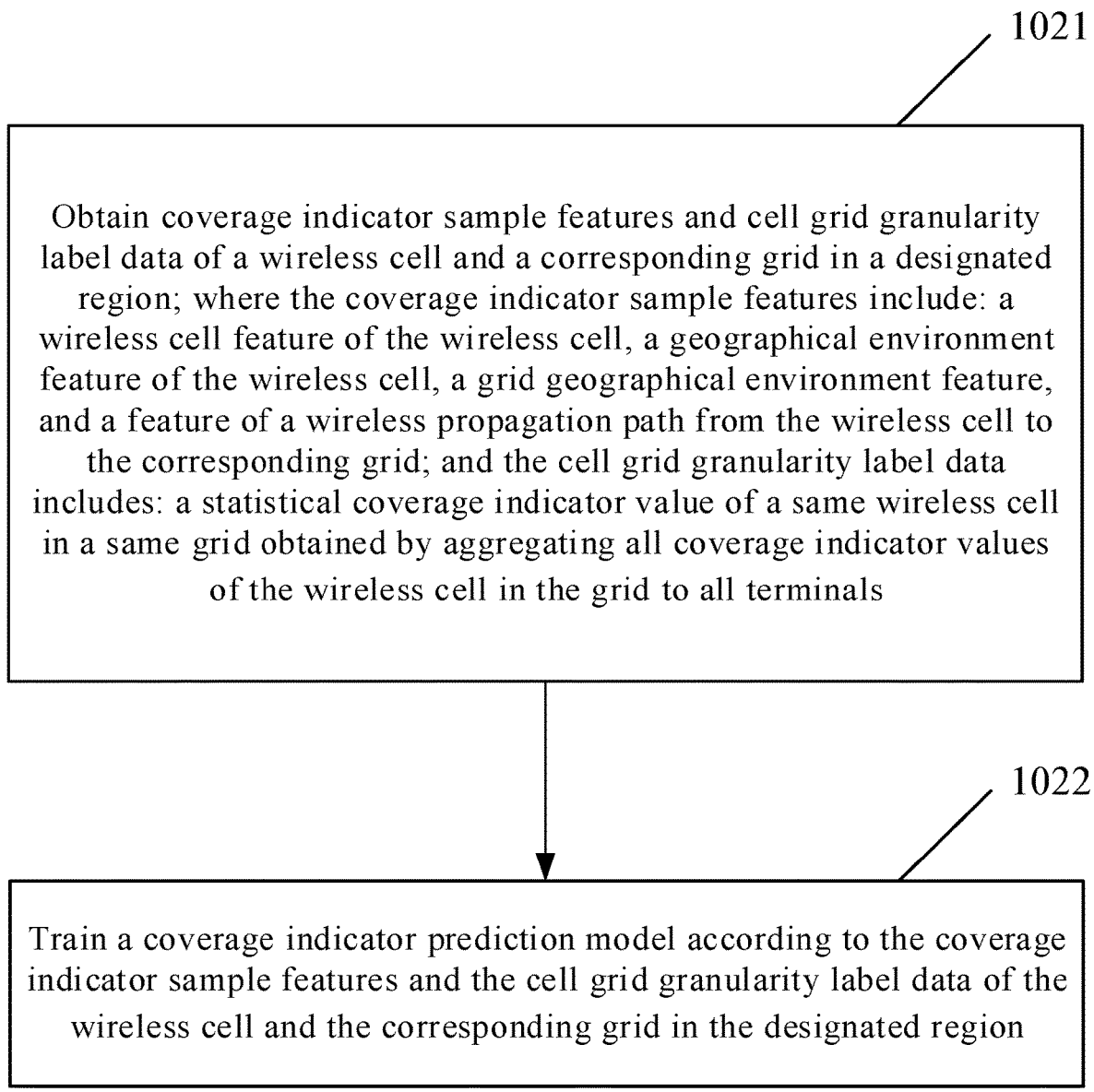
FIG. 2 is a flowchart of operation 102 in the coverage indicator prediction method according to an embodiment of the present disclosure.

FIG. 2 is a flowchart of operation 102 in the coverage indicator prediction method according to an embodiment of the present disclosure.

In some exemplary embodiments, referring to FIG. 2, the operation 102 may include operations 1021 and 1022.

At operation 1021, obtaining coverage indicator sample features and cell grid granularity label data of a wireless cell and a corresponding grid in a designated region; where the coverage indicator sample features include: a wireless cell feature of the wireless cell, a geographical environment feature of the wireless cell, a grid geographical environment feature, and a feature of a wireless propagation path from the wireless cell to the corresponding grid; and the cell grid granularity label data includes: a statistical coverage indicator value of a same wireless cell in a same grid obtained by aggregating all coverage indicator values of the wireless cell in the grid to all terminals.

In some exemplary embodiments, obtaining the coverage indicator sample features and the cell grid granularity label data of the wireless cell and the corresponding grid in the designated region includes: obtaining wireless cell data for describing the wireless cell in the designated region, map data for describing a geographical environment in grids in the designated region, and coverage signal data from the wireless cell in the designated region to a terminal, and the like; constructing the cell grid granularity label data according to the coverage signal data; and determining, according to the wireless cell data for describing the wireless cell in the designated region and the map data for describing the geographical environment in grids in the designated region, coverage indicator sample features of the wireless cell and the corresponding grid.

In some embodiments, the wireless cell data and the map data are as described in operation 100, and are not repeated here.

In some exemplary embodiments, the coverage signal data from the wireless cell to the terminal may be obtained from drive test information, or from a measurement report (MR), or from other real measurement data.

In some exemplary embodiments, the coverage signal data from the wireless cell to the terminal is desired to include at least: a wireless cell number, a terminal location, and a coverage indicator value.

In some exemplary embodiments, the coverage indicator may be a received signal strength indicator, a received signal quality indicator, or other indicators describing the coverage status.

In some exemplary embodiments, when the designated region is divided, a plane-coordinate system may be constructed with a given latitude range and a given longitude range corresponding to the designated region, the designated region may be divided into non-overlapping and non-intersecting grids according to a given grid size, and the grids are numbered with coordinates (x, y).

In some exemplary embodiments, the given grid size may be any size, typically 5 m×5 m, 10 m×10 m, 20 m×20 m, 50 m×50 m, or 100 m×100 m.

In some exemplary embodiments, obtaining the statistical coverage indicator value of the same wireless cell in the same grid by aggregating all coverage indicator values of the wireless cell in the grid to all terminals includes any one of: averaging and aggregating all coverage indicator values of the same wireless cell in the same grid to all terminals, to obtain the statistical coverage indicator value of the wireless cell in the grid, that is, calculating an average of all coverage indicator values of the same wireless cell in the same grid to all terminals, as the statistical coverage indicator value of the wireless cell in the grid; or averaging and aggregating all coverage indicator values within a receiving threshold range (a receiving threshold range defined by a 2G/3G/4G/5G communication protocol is desired) of the same wireless cell in the same grid to all terminals, to obtain the statistical coverage indicator value of the wireless cell in the grid, that is, calculating an average of all coverage indicator values within the receiving threshold range of the same wireless cell in the same grid to all terminals, as the statistical coverage indicator value of the wireless cell in the grid.

In some exemplary embodiments, through the above averaging and aggregating, errors caused by wireless signal fluctuations can be reduced, the prediction precision of the coverage indicator is improved.

In some exemplary embodiments, abnormal measured data is filtered out, so that the prediction precision of the coverage indicator can be improved.

In some exemplary embodiments, the wireless cell data of each wireless cell to be predicted may be converted into digits to obtain the wireless cell feature of each wireless cell. In other exemplary embodiments, the wireless cell data is directly used as the wireless cell feature. In some other embodiments, a portion of the wireless cell data is converted into digits to obtain the corresponding wireless cell feature, while another portion of the wireless cell data is used directly as the corresponding wireless cell feature.

In some exemplary embodiments, the wireless cell feature may include at least one of: a wireless cell number, a wireless cell location (e.g., longitude and latitude of the wireless cell), a wireless cell name, wireless cell antenna information, a wireless cell station height, a wireless cell station type, or the like, or may include other information describing the wireless cell.

In some exemplary embodiments, the map data within the coverage area of the wireless cell may be collected to obtain the geographical environment feature of the wireless cell.

In some exemplary embodiments, the geographical environment feature may include at least one of: a building average density, building type distribution, a building average height, terrain distribution, surface feature distribution, landform distribution, indoor and outdoor distribution, or the like, in the coverage area of the wireless cell, or may include other information describing the geographical environment of the wireless cell.

In some exemplary embodiments, the grid geographical environment feature may include at least one of: a building average density, building type distribution, a building average height, terrain distribution, surface feature distribution, landform distribution, indoor and outdoor distribution, or the like, in the grid, or may include other information describing the grid geographical environment.

In some exemplary embodiments, according to the wireless cell data for describing the wireless cell and the map data for describing a geographical environment in each grid in the designated region, the feature of the wireless propagation path from the wireless cell to the corresponding grid may be determined.

In some exemplary embodiments, the feature of the wireless propagation path from the wireless cell to the corresponding grid includes: a horizontal distance from an antenna to the grid, a vertical distance from the antenna to the grid, a linear distance from the antenna to the grid, a relative azimuth angle from the antenna to the grid in the horizontal direction, a relative azimuth angle from the antenna to the grid in the vertical direction, building type distribution on a propagation path from the antenna to the grid, a building average height on the propagation path from the antenna to the grid, terrain distribution on the propagation path from the antenna to the grid, surface feature distribution on the propagation path from the antenna to the grid, landform distribution on the propagation path from the antenna to the grid, a blocking degree on the propagation path from the antenna to the grid, or the like, or may include other features of the propagation path.

In some exemplary embodiments, by constructing coverage-related features accurately, the precision of the coverage prediction method can be further improved.

At operation 1022, training a coverage indicator prediction model according to the coverage indicator sample features and the cell grid granularity label data of the wireless cell and the corresponding grid in the designated region.

In some exemplary embodiments, all cell grid granularity label data in the designated region are cleaned and filtered, and the coverage indicator prediction model is trained according to the coverage indicator sample features and the cleaned and filtered cell grid granularity label data of the wireless cell and the corresponding grid in the designated region.

In some exemplary embodiments, cleaning and filtering all cell grid granularity label data in the designated region includes: deleting cell grid granularity label data meeting a preset condition.

The preset condition includes at least one of: a distance between a grid and a wireless cell greater than a distance threshold (the distance threshold here may be, for example, a coverage radius of the wireless cell, or, apparently, may be any other value, and the specific value of the distance threshold is not limited in the embodiment of the present disclosure); a grid outside a horizontal lobe width of a wireless cell antenna; or an amount of coverage signal data of a wireless cell in a grid less than or equal to an amount threshold.

In some embodiments, whether the grid is outside the horizontal lobe width of the wireless cell antenna is judged as follows: when $\theta_{ag} > \theta/2$, the grid is outside the horizontal lobe width of the wireless cell antenna, where $\theta_{ag} = \arccos(v_a \cdot v_g / (\|v_a\| \|v_g\|))$ is an angle between a straight line, which is between the wireless cell and the grid, and the horizontal main lobe direction of the wireless cell antenna, $v_a \cdot v_g = \sin(\alpha)(x_g - x_a) + \cos(\alpha)(y_g - y_a)$, $\|v_a\| = \sqrt{\sin(\alpha)\sin(\alpha) + \cos(\alpha)\cos(\alpha)} = 1$, and $\|v_g\| = \sqrt{(x_g - x_a)^2 + (y_g - y_a)^2}$, $v_a = (\sin(\alpha), \cos(\alpha))$ is a vector in the horizontal main lobe direction of the antenna that can be calculated according to a lobe direction angle $\alpha$, $v_g = (x_g - x_a, y_g - y_a)$ is a vector on the straight line between the wireless cell and the grid calculated according to a wireless cell antenna location $P_a$ and a grid location $P_g$, $\alpha$ is an angle between a horizontal main lobe direction of the wireless cell antenna and the north direction, $\theta$ is a horizontal lobe width of the wireless cell antenna, $P_a:(x_a, y_a)$ is the wireless cell antenna location, and $P_g:(x_g, y_g)$ is the grid location.

In some exemplary embodiments, by filtering out abnormal cell grid granularity label data, the precision of the coverage indicator prediction method can be further improved.

In some exemplary embodiments, coverage indicator samples are randomly divided by row (each denoted by a wireless cell number+a grid number) into a training set, a validation set, and a test set.

In some exemplary embodiments, coverage indicator samples are randomly divided into a training set, a verification set and a test set according to the numbers of the wireless cells.

In some exemplary embodiments, each coverage indicator sample includes the cell grid granularity label data and a corresponding coverage indicator sample feature.

In some exemplary embodiments, a grid search is performed on hyper-parameters of gradient-boosted tree to determine an optimal hyper-parameter that is used as input, and all samples are used for constructing the gradient-boosted tree model.

In some exemplary embodiments, the hyper-parameters of the gradient-boosted tree include at least one of: a loss function, a learning rate, a tree depth of a decision tree, or a sampling rate of samples, or any other parameter that may affect the prediction precision of the gradient-boosted tree.

In some exemplary embodiments, the loss function may be a mean square error loss function, a mean absolute error loss function, a mean absolute percentage error loss function, or any other regression prediction error loss function.

In some exemplary embodiments, an early stopping technique is used for monitoring a loss error of the verification set and determining an optimal number of iterations corresponding to the hyper-parameters.

In some exemplary embodiments, the optimal hyper-parameter is determined by comparing prediction errors of different hyper-parameters in the test set.

In some exemplary embodiments, the optimal hyper-parameter is used as input, and all coverage indicator samples are used for constructing the gradient-boosted tree model.

In some exemplary embodiments, the precision of the coverage prediction method can be improved with all the coverage indicator samples.

The coverage indicator prediction method according to the embodiment of the present disclosure predicts based on the trained coverage indicator prediction model without estimating a propagation path loss, which improves the efficiency and the prediction precision, and lays a foundation for accurate and rational wireless network planning.

Figure 3:
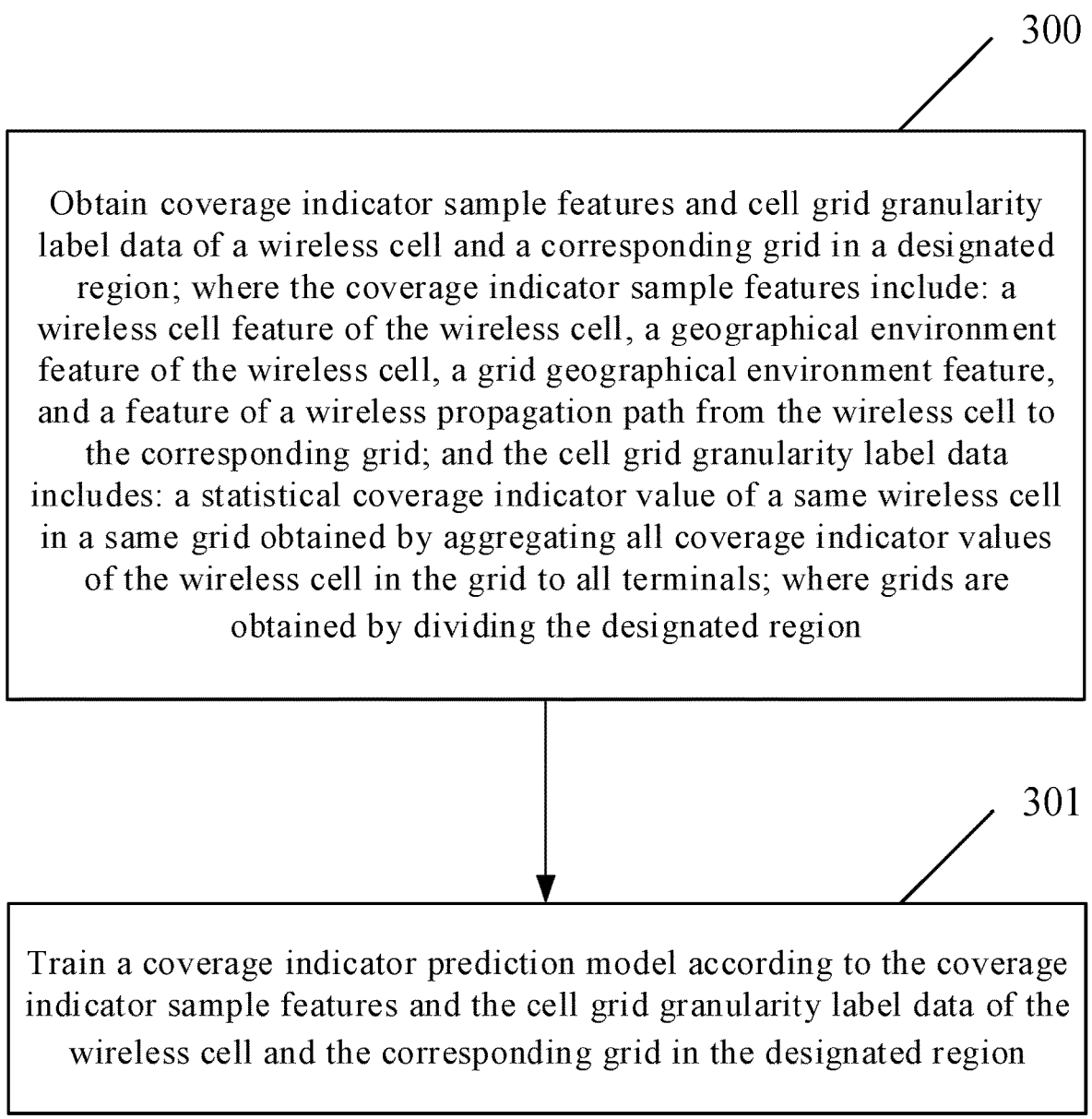
FIG. 3 is a flowchart of a model training method according to an embodiment of the present disclosure.

FIG. 3 is a flowchart of a model training method according to an embodiment of the present disclosure.

In a second aspect, referring to FIG. 3, an embodiment of the present disclosure provides a model training method, which may include operations 300 and 301.

At operation 300, obtaining coverage indicator sample features and cell grid granularity label data of a wireless cell and a corresponding grid in a designated region; where the coverage indicator sample features include: a wireless cell feature of the wireless cell, a geographical environment feature of the wireless cell, a grid geographical environment feature, and a feature of a wireless propagation path from the wireless cell to the corresponding grid; and the cell grid granularity label data includes: a statistical coverage indicator value of a same wireless cell in a same grid obtained by aggregating all coverage indicator values of the wireless cell in the grid to all terminals; where grids are obtained by dividing the designated region.

In some exemplary embodiments, obtaining the coverage indicator sample features and the cell grid granularity label data of the wireless cell and the corresponding grid in the designated region includes: obtaining wireless cell data for describing the wireless cell in the designated region, map data for describing a geographical environment in grids in the designated region, and coverage signal data from the wireless cell in the designated region to a terminal, and the like; constructing the cell grid granularity label data according to the coverage signal data; and determining, according to the wireless cell data for describing the wireless cell in the designated region and the map data for describing the geographical environment in grids in the designated region, coverage indicator sample features of the wireless cell and the corresponding grid.

In some embodiments, the wireless cell data and the map data are as described in operation 100, and are not repeated here.

In some exemplary embodiments, the coverage signal data from the wireless cell to the terminal may be obtained from drive test information, or from a measurement report (MR), or from other real measurement data.

In some exemplary embodiments, the coverage signal data from the wireless cell to the terminal is desired to include at least: a wireless cell number, a terminal location, and a coverage indicator value.

In some exemplary embodiments, the coverage indicator may be a received signal strength indicator, a received signal quality indicator, or other indicators describing the coverage status.

In some exemplary embodiments, when the designated region is divided, a plane-coordinate system may be constructed with a given latitude range and a given longitude range corresponding to the designated region, the designated region may be divided into non-overlapping and non-intersecting grids according to a given grid size, and the grids are numbered with coordinates (x, y).

In some exemplary embodiments, the given grid size may be any size, typically 5 m×5 m, 10 m×10 m, 20 m×20 m, 50 m×50 m, or 100 m×100 m.

In some exemplary embodiments, obtaining the statistical coverage indicator value of the same wireless cell in the same grid by aggregating all coverage indicator values of the wireless cell in the grid to all terminals includes any one of: averaging and aggregating all coverage indicator values of the same wireless cell in the same grid to all terminals, to obtain the statistical coverage indicator value of the wireless cell in the grid, that is, calculating an average of all coverage indicator values of the same wireless cell in the same grid to all terminals, as the statistical coverage indicator value of the wireless cell in the grid; or averaging and aggregating all coverage indicator values within a receiving threshold range (a receiving threshold range defined by a 2G/3G/4G/5G communication protocol is desired) of the same wireless cell in the same grid to all terminals, to obtain the statistical coverage indicator value of the wireless cell in the grid, that is, calculating an average of all coverage indicator values within the receiving threshold range of the same wireless cell in the same grid to all terminals, as the statistical coverage indicator value of the wireless cell in the grid.

In some exemplary embodiments, through the above averaging and aggregating, errors caused by wireless signal fluctuations can be reduced, the prediction precision of the coverage indicator is improved.

In some exemplary embodiments, abnormal measured data is filtered out, so that the prediction precision of the coverage indicator can be improved.

In some exemplary embodiments, the wireless cell data of each wireless cell to be predicted may be converted into digits to obtain the wireless cell feature of each wireless cell. In other exemplary embodiments, the wireless cell data is directly used as the wireless cell feature. In some other embodiments, a portion of the wireless cell data is converted into digits to obtain the corresponding wireless cell feature, while another portion of the wireless cell data is used directly as the corresponding wireless cell feature.

In some exemplary embodiments, the wireless cell feature may include at least one of: a wireless cell number, a wireless cell location (e.g., longitude and latitude of the wireless cell), a wireless cell name, wireless cell antenna information, a wireless cell station height, a wireless cell station type, or the like, or may include other information describing the wireless cell.

In some exemplary embodiments, the map data within the coverage area of the wireless cell may be collected to obtain the geographical environment feature of the wireless cell.

In some exemplary embodiments, the geographical environment feature may include at least one of: a building average density, building type distribution, a building average height, terrain distribution, surface feature distribution, landform distribution, indoor and outdoor distribution, or the like, in the coverage area of the wireless cell, or may include other information describing the geographical environment of the wireless cell.

In some exemplary embodiments, the grid geographical environment feature may include at least one of: a building average density, building type distribution, a building average height, terrain distribution, surface feature distribution, landform distribution, indoor and outdoor distribution, or the like, in the grid, or may include other information describing the grid geographical environment.

In some exemplary embodiments, according to the wireless cell data for describing the wireless cell and the map data for describing a geographical environment in each grid in the designated region, the feature of the wireless propagation path from the wireless cell to the corresponding grid may be determined.

In some exemplary embodiments, the feature of the wireless propagation path from the wireless cell to the corresponding grid includes: a horizontal distance from an antenna to the grid, a vertical distance from the antenna to the grid, a linear distance from the antenna to the grid, a relative azimuth angle from the antenna to the grid in the horizontal direction, a relative azimuth angle from the antenna to the grid in the vertical direction, building type distribution on a propagation path from the antenna to the grid, a building average height on the propagation path from the antenna to the grid, terrain distribution on the propagation path from the antenna to the grid, surface feature distribution on the propagation path from the antenna to the grid, landform distribution on the propagation path from the antenna to the grid, a blocking degree on the propagation path from the antenna to the grid, or the like, or may include other features of the propagation path.

In some exemplary embodiments, by constructing coverage-related features accurately, the precision of the coverage prediction method can be further improved.

At operation 301, training a coverage indicator prediction model according to the coverage indicator sample features and the cell grid granularity label data of the wireless cell and the corresponding grid in the designated region.

In some exemplary embodiments, all cell grid granularity label data in the designated region are cleaned and filtered, and the coverage indicator prediction model is trained according to the coverage indicator sample features and the cleaned and filtered cell grid granularity label data of the wireless cell and the corresponding grid in the designated region.

In some exemplary embodiments, cleaning and filtering all cell grid granularity label data in the designated region includes: deleting cell grid granularity label data meeting a preset condition.

The preset condition includes at least one of: a distance between a grid and a wireless cell greater than a distance threshold (the distance threshold here may be, for example, a coverage radius of the wireless cell, or, apparently, may be any other value, and the specific value of the distance threshold is not limited in the embodiment of the present disclosure); a grid outside a horizontal lobe width of a wireless cell antenna; or an amount of coverage signal data of a wireless cell in a grid less than or equal to an amount threshold.

In some embodiments, whether the grid is outside the horizontal lobe width of the wireless cell antenna is judged as follows: when $\theta_{ag} > \theta/2$, the grid is outside the horizontal lobe width of the wireless cell antenna,
where $\theta_{ag} = \arccos(v_a \cdot v_g / (\|v_a\| \|v_g\|))$ is an angle between a straight line, which is between the wireless cell and the grid, and the horizontal main lobe direction of the wireless cell antenna, $v_a \cdot v_g = \sin(\alpha)(x_g - x_a) + \cos(\alpha)(y_g - y_a)$, $\|v_a\| = \sqrt{\sin(\alpha)\sin(\alpha) + \cos(\alpha)\cos(\alpha)} = 1$, and $\|v_g\| = \sqrt{(x_g - x_a)^2 + (y_g - y_a)^2}$, $v_a = (\sin(\alpha), \cos(\alpha))$ is a vector in the horizontal main lobe direction of the antenna that can be calculated according to a lobe direction angle $\alpha$, $v_g = (x_g - x_a, y_g - y_a)$ is a vector on the straight line between the wireless cell and the grid calculated according to a wireless cell antenna location $P_a$ and a grid location $P_g$, $\alpha$ is an angle between a horizontal main lobe direction of the wireless cell antenna and the north direction, $\theta$ is a horizontal lobe width of the wireless cell antenna, $P_a:(x_a, y_a)$ is the wireless cell antenna location, and $P_g:(x_g, y_g)$ is a grid location.

In some exemplary embodiments, by filtering out abnormal cell grid granularity label data, the precision of the coverage indicator prediction method can be further improved.

In some exemplary embodiments, coverage indicator sample features are randomly divided by row (each denoted by a wireless cell number+a grid number) into a training set, a validation set, and a test set.

In some exemplary embodiments, coverage indicator samples are randomly divided into a training set, a verification set and a test set according to the numbers of the wireless cells.

In some exemplary embodiments, each coverage indicator sample includes the cell grid granularity label data and a corresponding coverage indicator sample feature.

In some exemplary embodiments, a grid search is performed on hyper-parameters of gradient-boosted tree to determine an optimal hyper-parameter that is used as input, and all samples are used for constructing the gradient-boosted tree model.

In some exemplary embodiments, the hyper-parameters of the gradient-boosted tree include at least one of: a loss function, a learning rate, a tree depth of a decision tree, or a sampling rate of samples, or any other parameter that may affect the prediction precision of the gradient-boosted tree.

In some exemplary embodiments, the loss function may be a mean square error loss function, a mean absolute error loss function, a mean absolute percentage error loss function, or any other regression prediction error loss function.

In some exemplary embodiments, an early stopping technique is used for monitoring a loss error of the verification set and determining an optimal number of iterations corresponding to the hyper-parameters.

In some exemplary embodiments, the optimal hyper-parameter is determined by comparing prediction errors of different hyper-parameters in the test set.

In some exemplary embodiments, the optimal hyper-parameter is used as input, and all coverage indicator samples are used for constructing the gradient-boosted tree model.

In some exemplary embodiments, the precision of the coverage prediction method can be improved with all the coverage indicator samples.

In the model training method according to the embodiment of the present disclosure, training is based on the data of coverage cases, and the wireless cell feature, the geographical environment feature, the grid geographical environment feature, and the geographical environment feature from the wireless cell to the grid, which reflect actual features during wireless communication, are comprehensively considered, and the model training precision is improved.

In a third aspect, an embodiment of the present disclosure provides an electronic device, including: at least one processor; and a storage device having at least one program stored thereon which, when executed by the at least one processor, causes the at least one processor to implement any coverage indicator prediction method as described above, or any model training method as described above.

The processor is a device with a data processing capability, including but not limited to a central processing unit (CPU), or the like. The storage device is a device with a data storage capability including but not limited to, a random-access memory (RAM, more specifically SDRAM, DDR, etc.), a read only memory (ROM), an electrically erasable programmable read only memory (EEPROM) or a flash.

In some embodiments, the processor and the memory are connected to each other via a bus, and further connected to other components of a computing device.

In a fourth aspect, an embodiment of the present disclosure provides a computer-readable storage medium storing a computer program thereon which, when executed by a processor, causes the processor to implement any coverage indicator prediction method as described above, or any model training method as described above.

Figure 4:
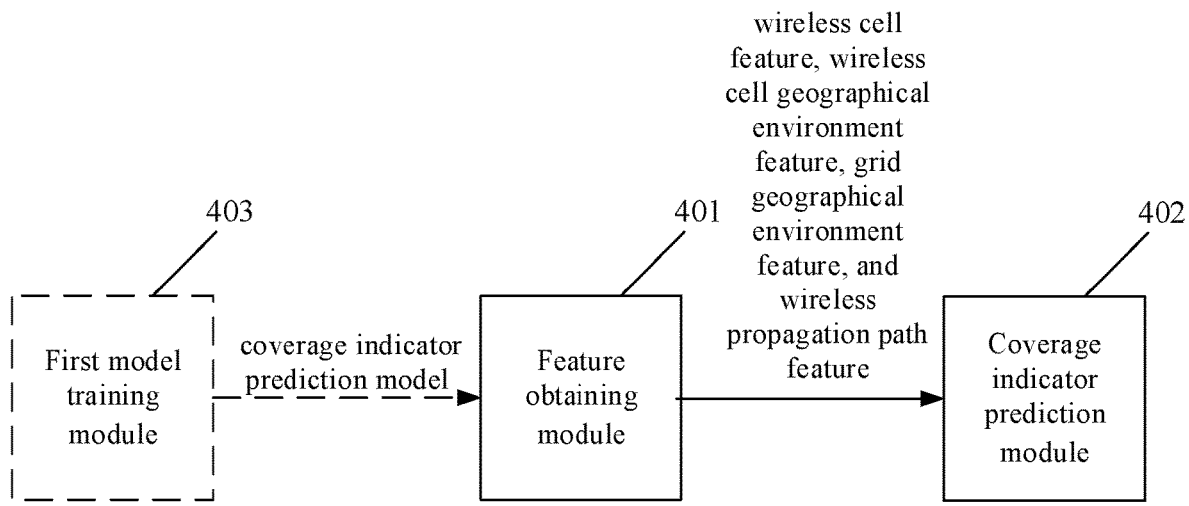
FIG. 4 is a block diagram of a coverage indicator prediction apparatus according to an embodiment of the present disclosure.

FIG. 4 is a block diagram of a coverage indicator prediction apparatus according to an embodiment of the present disclosure.

In a fifth aspect, referring to FIG. 4, an embodiment of the present disclosure provides a coverage indicator prediction apparatus, including: a feature obtaining module 401 configured to obtain a wireless cell feature of a wireless cell to be predicted, a geographical environment feature of the wireless cell to be predicted, a grid geographical environment feature, and a feature of a wireless propagation path from the wireless cell to be predicted to a corresponding grid, where grids are obtained by dividing a designated region; and a coverage indicator prediction module 402 configured to predict, according to the wireless cell feature of the wireless cell to be predicted, the geographical environment feature of the wireless cell to be predicted, the grid geographical environment feature, and the feature of the wireless propagation path from the wireless cell to be predicted to the corresponding grid, a coverage indicator value of the grids using a trained coverage indicator prediction model.

In some exemplary embodiments, the feature obtaining module 401 is configured to: obtain wireless cell data for describing the wireless cell to be predicted, and map data for describing a geographical environment in grids in a coverage area of the wireless cell to be predicted; and determine, according to the obtained wireless cell data and the obtained map data, a wireless cell feature of the wireless cell to be predicted, a geographical environment feature of the wireless cell to be predicted, a grid geographical environment feature, and a feature of a wireless propagation path from the wireless cell to be predicted to a corresponding grid.

In some exemplary embodiments, the apparatus further includes: a first model training module 403 configured to train the coverage indicator prediction model.

Figure 5:
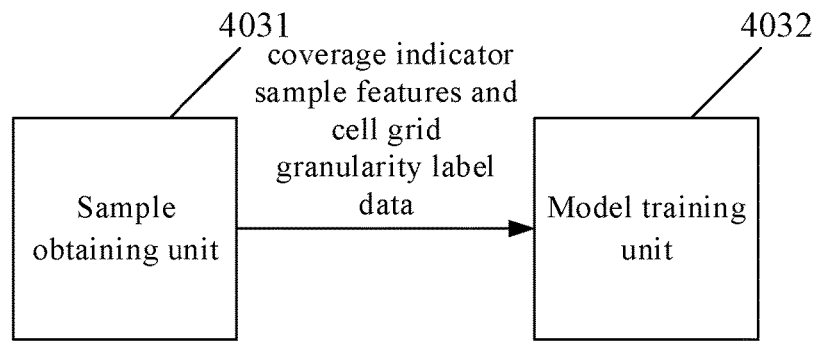
FIG. 5 is a block diagram illustrating components of a first model training module according to an embodiment of the present disclosure.

FIG. 5 is a block diagram illustrating components of a first model training module according to an embodiment of the present disclosure.

In some exemplary embodiments, the first model training module 403 includes: a sample obtaining unit 4031 configured to obtain a coverage indicator sample feature and cell grid granularity label data of a wireless cell and a corresponding grid in a designated region; where the coverage indicator sample features include: a wireless cell feature of the wireless cell, a geographical environment feature of the wireless cell, a grid geographical environment feature, and a feature of a wireless propagation path from the wireless cell to the corresponding grid; and the cell grid granularity label data includes: a statistical coverage indicator value of a same wireless cell in a same grid obtained by aggregating all coverage indicator values of the wireless cell in the grid to all terminals; and a model training unit 4032 configured to train the coverage indicator prediction model according to the coverage indicator sample features and the cell grid granularity label data of the wireless cell and the corresponding grid in the designated region.

In some exemplary embodiments, the sample obtaining unit 4031 is configured to: obtain wireless cell data for describing the wireless cell in the designated region, map data for describing a geographical environment in grids in the designated region, and coverage signal data from the wireless cell in the designated region to a terminal; construct the cell grid granularity label data according to the coverage signal data; and determine the coverage indicator sample features according to the wireless cell data for describing the wireless cell in the designated region and the map data for describing the geographical environment in grids in the designated region.

In some exemplary embodiments, the model training unit 4032 is further configured to: clean and filter all cell grid granularity label data in a designated region; and train the coverage indicator prediction model according to the coverage indicator sample features and the cleaned and filtered cell grid granularity label data of the wireless cell and the corresponding grid in the designated region.

In some exemplary embodiments, the model training unit 4032 is configured to clean and filter all cell grid granularity label data in a designated region by: deleting cell grid granularity label data meeting a preset condition. The preset condition includes at least one of: a distance between a grid and a wireless cell greater than a distance threshold; a grid outside a horizontal lobe width of a wireless cell antenna; or an amount of coverage signal data of a wireless cell in a grid less than or equal to an amount threshold.

The specific implementation process of the coverage indicator prediction apparatus is the same as that of the coverage indicator prediction method in the foregoing embodiments, and thus is not repeated here.

Figure 6:
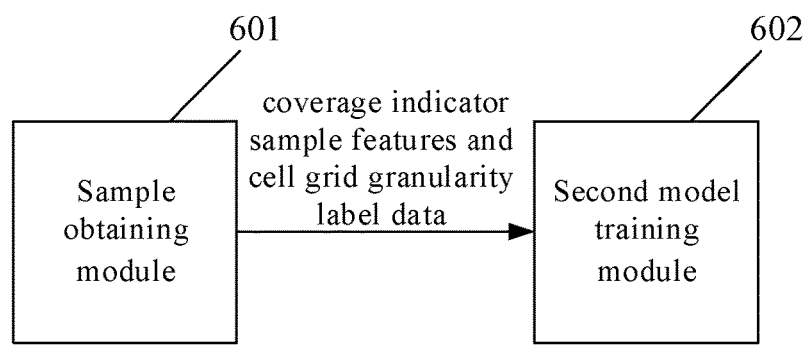
FIG. 6 is a block diagram of another model training apparatus according to an embodiment of the present disclosure.

FIG. 6 is a block diagram of a model training apparatus according to an embodiment of the present disclosure.

In a sixth aspect, referring to FIG. 6, an embodiment of the present disclosure provides a model training apparatus, including: a sample obtaining module 601 configured to obtain coverage indicator sample features and cell grid granularity label data of a wireless cell and a corresponding grid in a designated region; where the coverage indicator sample features include: a wireless cell feature of the wireless cell, a geographical environment feature of the wireless cell, a grid geographical environment feature, and a feature of a wireless propagation path from the wireless cell to the corresponding grid; and the cell grid granularity label data includes: a statistical coverage indicator value of a same wireless cell in a same grid obtained by aggregating all coverage indicator values of the wireless cell in the grid to all terminals; and where grids are obtained by dividing a designated region; and a second model training module 602 configured to train the coverage indicator prediction model according to the coverage indicator sample features and the cell grid granularity label data of the wireless cell and the corresponding grid in the designated region.

In some exemplary embodiments, the sample obtaining module 601 is configured to: obtain wireless cell data for describing the wireless cell in the designated region, map data for describing a geographical environment in grids in the designated region, and coverage signal data from the wireless cell in the designated region to a terminal; construct the cell grid granularity label data according to the coverage signal data; and determine the coverage indicator sample features according to the wireless cell data for describing the wireless cell in the designated region and the map data for describing the geographical environment in grids in the designated region.

In some exemplary embodiments, the second model training module 602 is further configured to: clean and filter all cell grid granularity label data in a designated region; and train the coverage indicator prediction model according to the coverage indicator sample features and the cleaned and filtered cell grid granularity label data of the wireless cell and the corresponding grid in the designated region.

In some exemplary embodiments, the second model training module 602 is configured to clean and filter all cell grid granularity label data in a designated region by: deleting cell grid granularity label data meeting a preset condition. The preset condition includes at least one of: a distance between a grid and a wireless cell greater than a distance threshold; a grid outside a horizontal lobe width of a wireless cell antenna; or an amount of coverage signal data of a wireless cell in a grid less than or equal to an amount threshold.

The specific implementation process of the model training apparatus is the same as that of the model training method in the foregoing embodiments, and thus is not repeated here.

Those of ordinary skill in the art will appreciate that all or some operations of the above described method, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). As is well known to those of ordinary skill in the art, the term computer storage medium includes volatile and nonvolatile, removable and non-removable medium implemented in any method or technology for storing information, such as computer-readable instructions, data structures, program modules or other data. The computer storage medium includes, but is not limited to, an RAM, an ROM, an EEPROM, a flash or any other memory technology, a CD-ROM, a digital versatile disc (DVD) or any other optical disc storage, a magnetic cartridge, a magnetic tape, a magnetic disk storage or any other magnetic storage device, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed exemplary embodiments, and although specific terms are employed, they are used and should be interpreted merely in a generic and descriptive sense, not for purposes of limitation. In some instances, as would be apparent to one skilled in the art, features, characteristics and/or elements described in connection with a particular embodiment may be used alone or in combination with features, characteristics and/or elements described in connection with another embodiment, unless expressly stated otherwise. It will, therefore, be understood by those skilled in the art that various changes in form and details may be made therein without departing from the scope of the present disclosure as set forth in the appended claims.

What is claimed is:

1. A coverage indicator prediction method, comprising:
obtaining a wireless cell feature of a wireless cell to be predicted, a geographical environment feature of the wireless cell to be predicted, a grid geographical environment feature, and a feature of a wireless propagation path from the wireless cell to be predicted to a corresponding grid, wherein grids are obtained by dividing a designated region; and
predicting, according to the wireless cell feature of the wireless cell to be predicted, the geographical environment feature of the wireless cell to be predicted, the grid geographical environment feature, and the feature of the wireless propagation path from the wireless cell to be predicted to the corresponding grid, a coverage indicator value of the grids using a trained coverage indicator prediction model,
wherein before predicting, according to the wireless cell feature of the wireless cell to be predicted, the geographical environment feature of the wireless cell to be predicted, the grid geographical environment feature, and the feature of the wireless propagation path from the wireless cell to be predicted to the corresponding grid, the coverage indicator value of the grids using the trained coverage indicator prediction model, the method further comprises:
training the coverage indicator prediction model,
wherein training the coverage indicator prediction model comprises:
obtaining coverage indicator sample features and cell grid granularity label data of a wireless cell and a corresponding grid in the designated region; wherein the coverage indicator sample features comprise: a wireless cell feature of the wireless cell, a geographical environment feature of the wireless cell, a grid geographical environment feature, and a feature of a wireless propagation path from the wireless cell to the corresponding grid; and the cell grid granularity label data comprises: a statistical coverage indicator value of a same wireless cell in a same grid obtained by aggregating all coverage indicator values of the wireless cell in the grid to all terminals; and
training the coverage indicator prediction model according to the coverage indicator sample features and the cell grid granularity label data of the wireless cell and the corresponding grid in the designated region.

2. The method according to claim 1, wherein obtaining the coverage indicator sample features and the cell grid granularity label data of the wireless cell and the corresponding grid in the designated region comprises:
obtaining wireless cell data for describing the wireless cell in the designated region, map data for describing a geographical environment in the designated region, and coverage signal data from the wireless cell in the designated region to a terminal;
constructing the cell grid granularity label data according to the coverage signal data; and
determining the coverage indicator sample features according to the wireless cell data for describing the wireless cell in the designated region and the map data for describing the geographical environment in the designated region.

3. The method according to claim 1, wherein before training the coverage indicator prediction model according to the coverage indicator sample features and the cell grid granularity label data of the wireless cell and the corresponding grid in the designated region, the method further comprises:
cleaning and filtering all cell grid granularity label data in the designated region; and
training the coverage indicator prediction model according to the coverage indicator sample features and the cell grid granularity label data of the wireless cell and the corresponding grid in the designated region comprises:
training the coverage indicator prediction model according to the coverage indicator sample features and the cleaned and filtered cell grid granularity label data of the wireless cell and the corresponding grid in the designated region.

4. The method according to claim 3, wherein cleaning and filtering all cell grid granularity label data in the designated region comprises:
deleting cell grid granularity label data meeting a preset condition;
wherein the preset condition comprises at least one of:
a distance between a grid and a wireless cell greater than a distance threshold;
a grid outside a horizontal lobe width of a wireless cell antenna; or
an amount of coverage signal data of a wireless cell in a grid less than or equal to an amount threshold.

5. The method according to claim 2, wherein obtaining the statistical coverage indicator value of the same wireless cell in the same grid obtained by aggregating all coverage indicator values of the wireless cell in the grid to all terminals comprises:
averaging and aggregating all coverage indicator values of the same wireless cell in the same grid to all terminals, to obtain the statistical coverage indicator value of the wireless cell in the grid;
or, averaging and aggregating all coverage indicator values within a receiving threshold range of the same wireless cell in the same grid to all terminals, to obtain the statistical coverage indicator value of the wireless cell in the grid.

6. The method according to claim 1, wherein obtaining the wireless cell feature of the wireless cell to be predicted, the geographical environment feature of the wireless cell to be predicted, the grid geographical environment feature, and the feature of the wireless propagation path from the wireless cell to be predicted to the corresponding grid comprises:
obtaining wireless cell data for describing the wireless cell to be predicted, and map data for describing a geographical environment in a coverage area of the wireless cell to be predicted; and
determining, according to the obtained wireless cell data and the obtained map data, the wireless cell feature of the wireless cell to be predicted, the geographical environment feature of the wireless cell to be predicted, the grid geographical environment feature, and the feature of the wireless propagation path from the wireless cell to be predicted to the corresponding grid.

7. The method according to claim 1, wherein the coverage indicator prediction model comprises a gradient-boosted tree model.

8. An electronic device, comprising:
at least one processor; and
a storage device having at least one program stored thereon which, when executed by the at least one processor, causes the at least one processor to implement the coverage indicator prediction method according to claim 1.

9. A non-transitory computer readable storage medium storing a computer program thereon which, when executed by a processor, causes the processor to implement the coverage indicator prediction method according to claim 1.

10. A model training method, comprising:
obtaining coverage indicator sample features and cell grid granularity label data of a wireless cell and a corresponding grid in a designated region; wherein the coverage indicator sample features comprise: a wireless cell feature of the wireless cell, a geographical environment feature of the wireless cell, a grid geographical environment feature, and a feature of a wireless propagation path from the wireless cell to the corresponding grid; and the cell grid granularity label data comprises: a statistical coverage indicator value of a same wireless cell in a same grid obtained by aggregating all coverage indicator values of the wireless cell in the grid to all terminals; and wherein grids are obtained by dividing a designated region; and
training, according to the coverage indicator sample features and the cell grid granularity label data of the wireless cell and the corresponding grid in the designated region, a coverage indicator prediction model for predicting a coverage indicator value of the grids.

11. The method according to claim 10, wherein obtaining the coverage indicator sample features and the cell grid granularity label data of the wireless cell and the corresponding grid in the designated region comprises:
obtaining wireless cell data for describing the wireless cell in the designated region, map data for describing a geographical environment in the designated region, and coverage signal data from the wireless cell in the designated region to a terminal;
constructing the cell grid granularity label data according to the coverage signal data; and
determining the coverage indicator sample features according to the wireless cell data for describing the wireless cell in the designated region and the map data for describing the geographical environment in the designated region.

12. The method according to claim 11, wherein
before training the coverage indicator prediction model according to the coverage indicator sample features and the cell grid granularity label data of the wireless cell and the corresponding grid in the designated region, the method further comprises:
cleaning and filtering all cell grid granularity label data in the designated region; and
training the coverage indicator prediction model according to the coverage indicator sample features and the cell grid granularity label data of the wireless cell and the corresponding grid in the designated region comprises:
training the coverage indicator prediction model according to the coverage indicator sample features and the cleaned and filtered cell grid granularity label data of the wireless cell and the corresponding grid in the designated region.

13. The method according to claim 12, wherein cleaning and filtering all cell grid granularity label data in the designated region comprises:
deleting cell grid granularity label data meeting a preset condition;
wherein the preset condition comprises at least one of:
a distance between a grid and a wireless cell greater than a distance threshold;
a grid outside a horizontal lobe width of a wireless cell antenna; or
an amount of coverage signal data of a wireless cell in a grid less than or equal to an amount threshold.

14. The method according to claim 10, wherein obtaining the statistical coverage indicator value of the same wireless cell in the same grid obtained by aggregating all coverage indicator values of the wireless cell in the grid to all terminals comprises:
averaging and aggregating all coverage indicator values of the same wireless cell in the same grid to all terminals, to obtain the statistical coverage indicator value of the wireless cell in the grid;
or, averaging and aggregating all coverage indicator values within a receiving threshold range of the same wireless cell in the same grid to all terminals, to obtain the statistical coverage indicator value of the wireless cell in the grid.

15. The method according to claim 10, wherein the coverage indicator prediction model comprises a gradient-boosted tree model.

16. An electronic device, comprising:
at least one processor; and
a storage device having at least one program stored thereon which, when executed by the at least one processor, causes the at least one processor to implement the model training method according to claim 10.

17. A non-transitory computer readable storage medium storing a computer program thereon which, when executed by a processor, causes the processor to implement the model training method according to claim 10.

* * * * *